(No Model.) 2 Sheets—Sheet 1.

J. N. KAILOR.
RECLEANER FOR CLOVER HULLERS.

No. 467,978. Patented Feb. 2, 1892.

Witnesses:
A. M. Hood.
B. R. Hood.

Inventor:
John N. Kailor
By H. P. Hood
Atty.

(No Model.)
2 Sheets—Sheet 2.

J. N. KAILOR.
RECLEANER FOR CLOVER HULLERS.

No. 467,978.  Patented Feb. 2, 1892.

Witnesses:
A. M. Hood.
C. K. Hood.

Inventor.
John N. Kailor.
By H. P. Hood.
Atty.

UNITED STATES PATENT OFFICE.

JOHN N. KAILOR, OF COLUMBUS, INDIANA, ASSIGNOR TO REEVES & CO., OF SAME PLACE.

RECLEANER FOR CLOVER-HULLERS.

SPECIFICATION forming part of Letters Patent No. 467,978, dated February 2, 1892.

Application filed September 18, 1891. Serial No. 406,052. (No model.)

*To all whom it may concern:*

Be it known that I, JOHN N. KAILOR, a citizen of the United States, residing at Columbus, in the county of Bartholomew and State of Indiana, have invented a new and useful Recleaner for Clover-Hullers, of which the following is a specification.

My invention relates to an improvement in recleaning attachments for clover-hullers.

The object of my improvement is to provide, in connection with a recleaner for a clover-huller, an improved forced-feed device and improved means for returning the "tailings" from the recleaner to the hulling-cylinder.

The accompanying drawings illustrate my invention.

Figure 1:
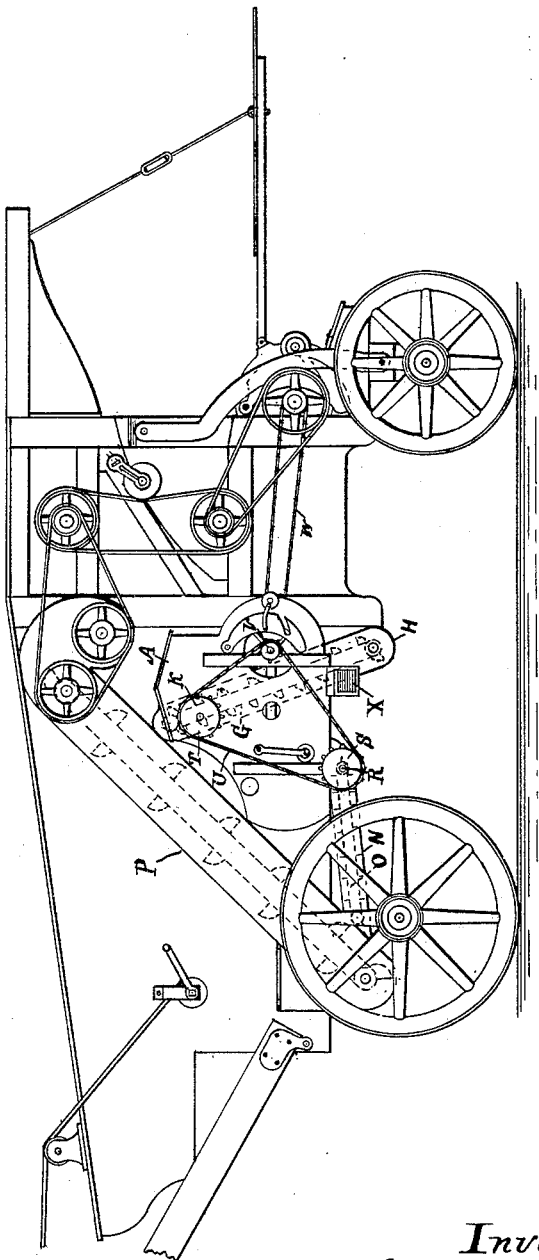
Figure 2:
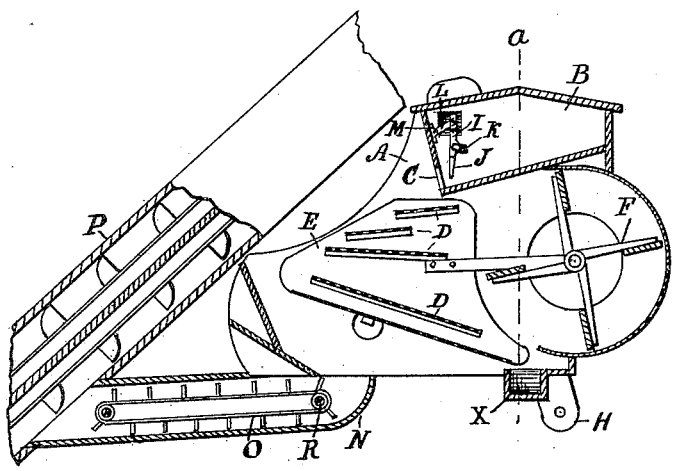
Figure 3:
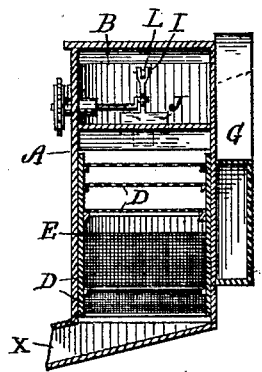

Figure 1 represents a side elevation of a clover-hulling machine having my recleaner. Fig. 2 represents a longitudinal section of the recleaner and a portion of the tailings-elevator of the clover-huller. Fig. 3 represents a transverse section at $a$, Fig. 2.

In the drawings, A designates the casing of the recleaner, having in its upper part a receiving-chamber B, provided with the outlet-opening C. A series of sieves D D is arranged in a vibrating frame E so as to receive the seed discharged from the chamber B, and a fan F is provided for discharging a blast of air over the sieve in the usual well-known manner. An elevator-belt G (shown in dotted lines, Fig. 1) raises the seed from the seed-trough H of the clover-huller and discharges the seed into the receiving-chamber B. Mounted in chamber B before the outlet-opening C is a force-feed device consisting of a lever I, having at its lower end a scraper J and mounted upon a crank-shaft K, having suitable bearings in the side of the main casing. The upper end of lever I is connected by a link L with a bracket M, which is secured to the wall of chamber B, said link being pivoted at opposite ends, respectively, to the lever and to the bracket. Arranged so as to receive the tailings from the recleaner is a discharge-spout N, having a conveyer-belt O mounted therein. Spout N is connected at its discharging end with the tailings-elevator P of the clover-huller, the arrangement being such that the tailings from the recleaner are conveyed to the foot of the tailings-elevator of the clover-huller and are there mingled with the tailings from the clover-huller and are with them returned to the lower hulling-cylinder. One end of conveyer-belt O is mounted on a shaft R, provided with a sprocket-wheel S. Shaft K is provided with a sprocket-wheel T, and motion is communicated to said shafts and sprocket-wheels by means of a chain belt U, passing over sprocket-wheels S and T and a similar wheel V, mounted on the shaft of the recleaner-fan, which is driven by a chain belt W from the fan-shaft of the clover-huller.

In operation the separated seed from the clover-huller is deposited in the seed-trough H and is raised therefrom by the conveyer-belt G and is discharged into chamber B of the recleaner, as before described. From chamber B portions of the uncleaned seed are forced out of the opening C at regular intervals by means of the lever I and are discharged upon the vibrating sieves D, through which the seed passes, being subjected to the blast from the fan F and being finally discharged at the seed-spout X. The light chaff is blown out at the rear of the recleaner, and the heavier particles, including unseparated seed, striking the deflector $l$, fall into the trough N and are conveyed with a positive movement by the conveyer-belt O to the tailings-elevator P of the clover-huller.

I claim as my invention—

In a recleaner for clover-hullers, the combination of the recleaner-casing, the tailings-elevator of the clover-huller, and the discharge-spout N, having a conveyer-belt mounted therein and arranged to convey the tailings from the recleaner-casing to said tailings-elevator, as set forth.

JOHN N. KAILOR.

Witnesses:
E. L. WILLIAMS,
M. R. REEVES.